No. 714,065.  
N. J. TUBBS.  
FLEXIBLE JOINT PIPE COUPLING.  
(Application filed Jan. 20, 1902.)  
Patented Nov. 18, 1902.
(No Model.)
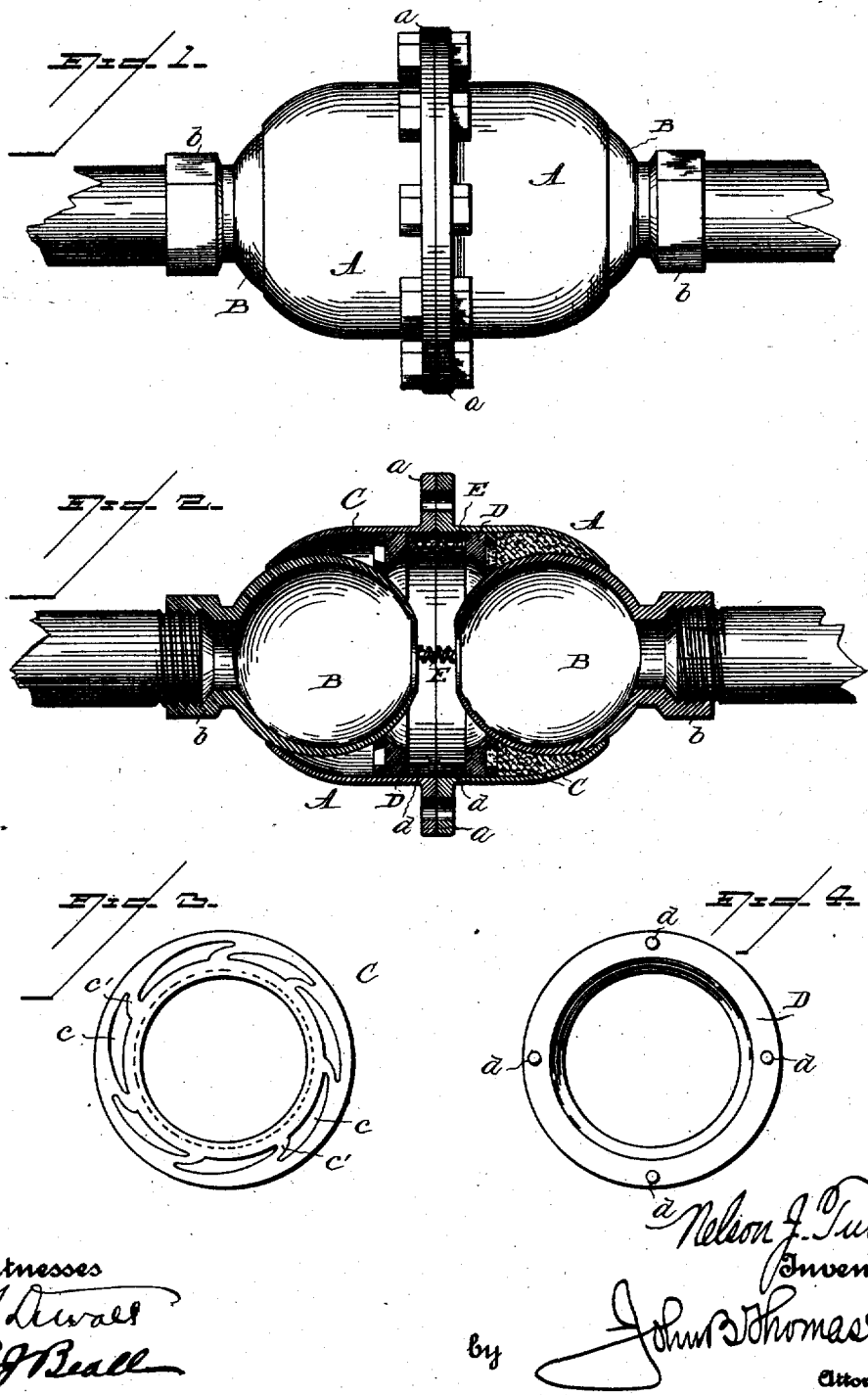

UNITED STATES PATENT OFFICE.

NELSON J. TUBBS, OF LOUISVILLE, KENTUCKY, ASSIGNOR OF ONE-HALF TO WILLIAM M. SPICER, OF LOUISVILLE, KENTUCKY.

FLEXIBLE-JOINT PIPE-COUPLING.

SPECIFICATION forming part of Letters Patent No. 714,065, dated November 18, 1902.

Application filed January 20, 1902. Serial No. 90,567. (No model.)

*To all whom it may concern:*

Be it known that I, NELSON J. TUBBS, a citizen of the United States, and a resident of Louisville, Kentucky, have invented certain new and useful Improvements in Flexible-Joint Pipe-Couplings, of which the following is a specification.

This invention is an improvement in pipe-couplings, and relates more especially to that class of couplings in which a flexible joint is provided, so that either one of the connected pipes may be turned at an angle to the other and said joint at all times maintain a tight fit to prevent the escape of the liquid, gas, or steam which passes through the pipes and flexible coupling.

The primary object of the invention is the production of a ball-and-socket coupling in which a closely-fitting joint will be maintained by having the parts adjustable automatically to take up the wear and insure a proper engagement in any position the joint may assume, as well as to prevent lateral movement of the ball with respect to the socket or casing.

A further object of the invention is to provide a pipe-coupling of this character which will permit the use of a soft-metal packing-ring that will not rust or corrode, so that the surface of the hollow ball will be kept smooth to insure a close fit and permit the parts of the joint or coupling to be easily moved.

The invention consists in the combination, with the hollow ball and socket or casing, of a compressible packing-ring bearing against the inner end of the hollow ball, a packing in the rear of said ring, and a spring-actuated follower engaging the ring and adapted to force it against the packing and in contact with the inner end of the hollow ball.

The invention further consists in the particular construction and combination of parts, all as hereinafter fully described, and specifically set forth in the appended claims.

In the accompanying drawings, which form a part of this specification, and in which like letters of reference indicate like parts in the several views, Figure 1 is a side elevation of a flexible-joint pipe-coupling constructed in accordance with my invention. Fig. 2 is a sectional view through the longitudinal center of the coupling. Fig. 3 is a detail view of the packing-ring. Fig. 4 is a detail view of the follower.

Referring to said drawings, A designates the socket or casing, the outer end of which is spherical and provided with an opening, through which a part of the hollow ball projects, while the inner end of said socket or casing is formed with a projecting annular flange $a$, by which it is attached to a similar socket, as shown, the said flange having holes through which the connecting-bolts pass. Located within this casing is a hollow ball B, which is provided at its inner end with an opening forming a passage-way and at its outer end with an internally-threaded collar $b$, by which said ball is coupled to a pipe, the said outer end projecting through the casing A and having a bearing against the contracted outer end of said casing.

C designates a packing-ring which is located within the casing and bears against the side of said casing and against the inner end of the hollow ball, being held in such engagement by a spring-actuated follower D. This follower comprises a ring which is narrower than the packing-ring and preferably beveled at its inner edge, as shown, the said ring being provided with projecting pins $d$, which serve to hold in place helical springs E, which bear against the ring or follower and force it upon the packing-ring, said pins also serving as stops. When a double joint is employed, as shown, the helical springs E extend from one follower to the other. In the contracted end of the socket or casing, back of the packing-ring C, is placed a packing of cotton-waste or other suitable material, and as this packing is held in place and compressed by the packing-ring and follower it will greatly assist in providing a tight joint between the ball and casing.

One of the important features of the invention is the particular construction of the packing-ring C, which is preferably made of lead, copper, or other soft metal and is provided with openings forming a series of arms $c$, which extend tangentially from the inner part of the ring to the outer part thereof. By forming the ring in this manner and of soft metal it may be contracted laterally, so as to losely fit between the ball and casing and bear upon the packing F in the rear of the same. It will also be noted that the packing-ring being made of lead or copper will not corrode and will not, therefore, affect the bearing-surface of the hollow ball. This packing-ring bears against the inner end portion of the ball beyond the center thereof, and not only serves in connection with the follower to keep said ball pressed against the contracted end of the casing, but also prevents lateral movement of said ball.

It has been found very difficult to provide a ball-and-socket pipe-coupling which will maintain a closely-fitting joint and prevent leakage, more especially when the coupling is to be used for connecting steam and gas pipes, as the constant turning of the ball in one direction is likely to produce an uneven wear of the parts and produce leakage. The bearing-surfaces may also be affected in a like manner by a sudden jar on the joint. The coupling constructed as herein shown and described, combining the compressible packing-ring and follower in connection with a ball and socket, constantly takes up any wear that may come upon the bearing-surfaces, and the peculiar shape of the packing-ring permits any and all parts of the same to conform to any unevenness. In case said packing-ring is made of copper its resiliency will compensate for any sudden jar that may come upon the joint. The effectiveness of this particular joint is further increased by the packing material, which is interposed between the inner and outer bearings for the ball, and the packing-ring and follower by constantly pressing the ball to its bearings will prevent the packing material from getting in between the bearing-surfaces, while the stop-pins $d$ prevent longitudinal movement.

The operation of the joint or coupling in use is similar to that of the ordinary ball-and-socket pipe-coupling, rendered more effective and practical by the advantages which accrue from the construction and application of the packing-ring and follower, inasmuch as these parts of my improved coupling provide a flexible joint that will remain perfectly gas and steam tight by compensating for all wear on the bearing-surfaces of the working parts. The particular construction and arrangement of the parts also provide for readily taking the coupling apart for the purpose of cleaning the same and renewing the packings.

It will be noted that the ring or follower D covers the openings formed in the packing-ring, but does not come in contact with the hollow ball.

Having thus described my invention, what I claim as new, and desire to secure by Letters Patent, is—

1. In a pipe-coupling, the combination with the hollow ball and socket or casing, of a soft-metal packing-ring having openings forming tangential arms connecting the inner and outer portion of said ring, and means for pressing said ring against the inner end of the ball, substantially as shown and described.

2. In a pipe-coupling, the combination with the hollow ball and socket or casing, of a soft-metal packing-ring having openings forming tangential arms connecting the inner and outer portions of said ring; together with a spring-actuated follower engaging the ring and pressing it in contact with the ball, substantially as shown and described.

3. In a pipe-coupling, the combination with the ball and socket, of a metal ring having openings forming tangential arms connecting the inner and outer portions of said ring, a spring-actuated follower engaging the packing-ring and forcing it in contact with the ball, and a packing interposed between the packing-ring and outer bearing for the ball, substantially as shown and described.

4. In an article of manufacture, a packing-ring having openings forming tangential arms, whereby said ring may be compressed laterally, substantially as shown and described.

In testimony whereof I affix my signature in the presence of two witnesses.

NELSON J. TUBBS.

Witnesses:
JAMES E. WILLIAMS, Jr.,
C. E. DURUIL.